United States Patent [19]
Nelson

[11] Patent Number: 5,627,580
[45] Date of Patent: May 6, 1997

[54] SYSTEM AND METHOD FOR ENHANCED PRINTING

[75] Inventor: William E. Nelson, Dallas, Tex.

[73] Assignee: Texas Instruments Incorporated, Dallas, Tex.

[21] Appl. No.: 482,476

[22] Filed: Jun. 7, 1995

Related U.S. Application Data

[62] Division of Ser. No. 97,419, Jul. 26, 1993.

[51] Int. Cl.⁶ .................................................... H04N 1/21
[52] U.S. Cl. .......................... 347/239; 347/240; 347/251; 347/255; 358/298
[58] Field of Search .................................... 347/239, 240, 347/257, 255; 358/298

[56] References Cited

U.S. PATENT DOCUMENTS

| | | |
|---|---|---|
| 4,314,261 | 2/1982 | Martinage . |
| 4,596,992 | 6/1986 | Hornbeck . |
| 4,793,699 | 12/1988 | Tokuhara . |
| 5,061,049 | 10/1991 | Hornbeck . |
| 5,105,207 | 4/1992 | Nelson . |
| 5,432,722 | 7/1995 | Guilfoyle et al. ............... 364/713 |
| 5,459,610 | 10/1995 | Bloom et al. ............... 359/572 |
| 5,489,952 | 2/1996 | Gove et al. ............... 348/771 |

FOREIGN PATENT DOCUMENTS

| | | |
|---|---|---|
| 0321143A3 | 6/1989 | European Pat. Off. . |
| 0433981A2 | 6/1991 | European Pat. Off. . |
| 61-243478 | 10/1986 | Japan . |
| WO92/01353 | 1/1992 | WIPO . |

Primary Examiner—Mark J. Reinhart
Attorney, Agent, or Firm—Julie L. Reed; James C. Kesterson; Richard L. Donaldson

[57] ABSTRACT

Higher quality printing is difficult in implementation in spatial light modulator printers. The two major problems are accomplishing gray scale within the line time constraints, and eliminating staircasing artifacts within the images printed (81). It can be improved by using an alternate way of resetting cells on the spatial light modulator when data is being loaded onto the cells, timing delay (86), horizontal offset (84), and differently sized pixels (80, 82).

4 Claims, 13 Drawing Sheets

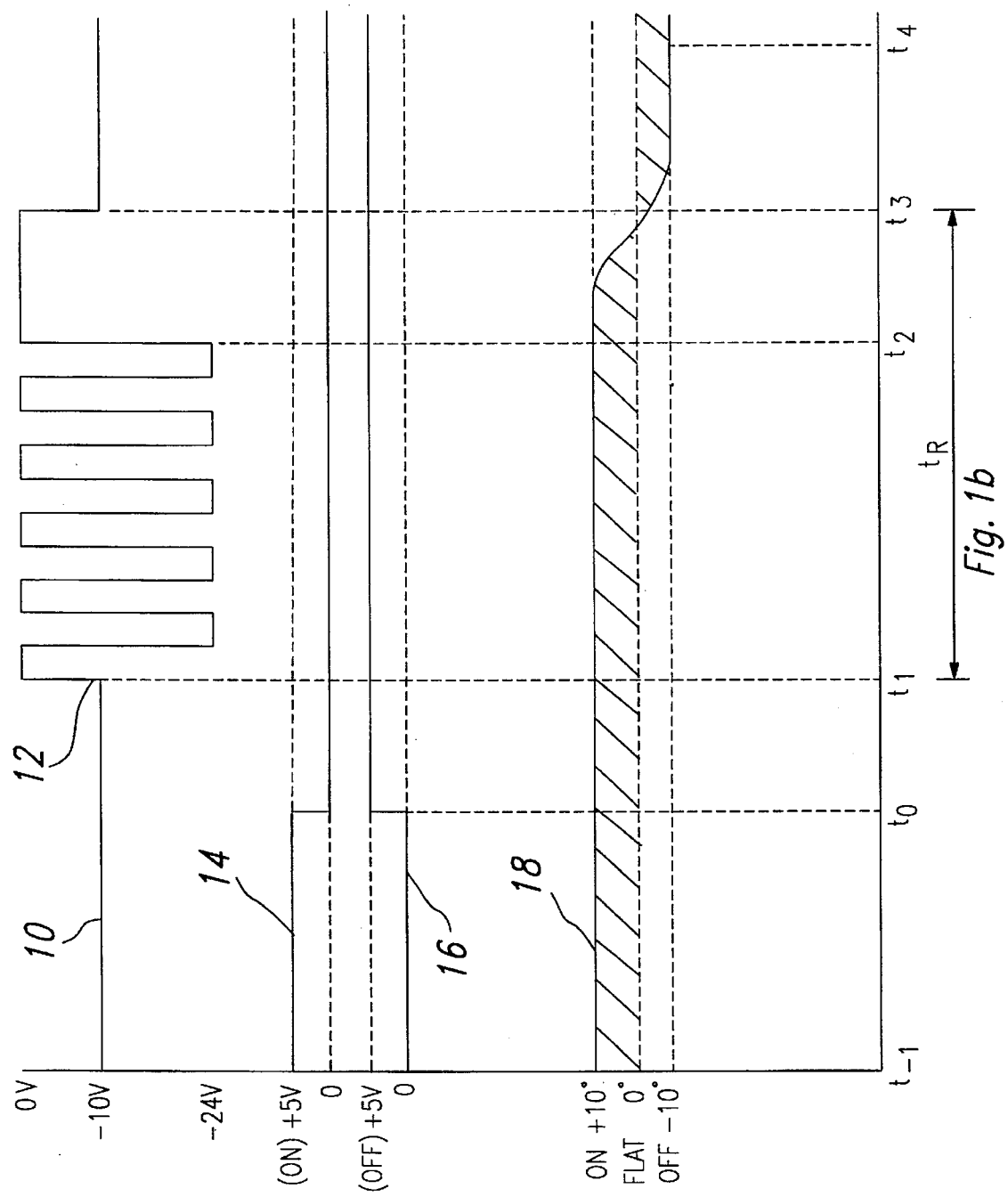

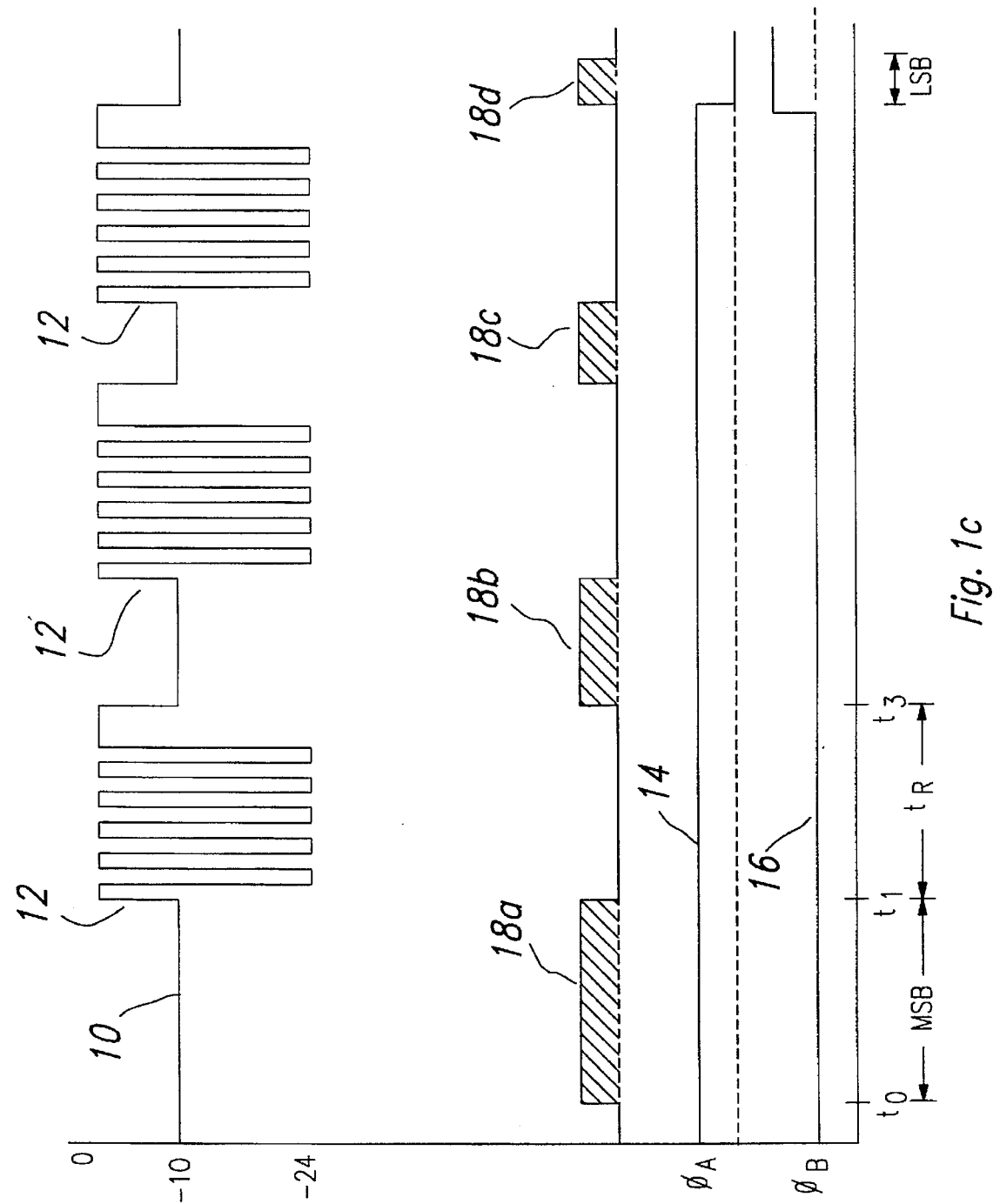

SYSTEM AND METHOD FOR ENHANCED PRINTING

This is a division of application Ser. No. 08/097,419, filed Jul. 26, 1993.

BACKGROUND OF THE INVENTION

1. Field of the Invention

This invention relates to printing, more specifically to printing with enhanced images and gray scale.

2. Background of the Invention

Digital copiers and printers have inherent problems reproducing high-resolution images and gray scale. Desktop laser printers generally have only 300 dots-per-inch (dpi) addressability, and print with slightly oversized pixels to allow overlap, which defines the actual printer resolution. These limitations show up as ragged edges on text and aliasing artifacts on graphics because at nominal resolutions the individual pixels cannot accurately replicate curves and diagonal lines.

An alternate dot manipulation method has appeared commercially to address the drawback, but it does not produce gray scale levels. Instead, it varies the shape, size, or location of digital black pixels by controlling laser power and timing. Shortening the dot exposure time, and delaying it, creates a smaller, oval spot which allows dot positioning within the standard pixel cell boundaries. Additionally, the spot can move across the width of the pixel cell in the direction of the raster scanning motion. Reducing power levels in the laser can flatten the spot in the print-process direction orthogonal to the scanning motion. Typically the scan direction is horizontal and the print-process direction is vertical on a page. Smoother appearing edges are achieved by appropriate placement of suitable distorted pixels, and the method is generally referred to as resolution enhancement.

Laser printers can readily achieve higher resolutions than 300 dpi with more complex controllers and printer process subsystems. Printer page-description languages, for example, can present a document, or image, to a digital printer at its limiting resolution. However, the burdens on printer memory, microprocessors, and the capability of the printer equipment and optical scanner to support higher resolutions typically climb as a square of the linear resolution. Systems used in applications demanding higher resolution can run from 1200 to 2500 dpi, but they are proportionately more expensive than generic desktop 300 dpi printers. The benefit is that the added linear resolution permits a binary printer to simulate gray scale images through a process called half-toning.

The xerographic process as embodied in printers, copiers and facsimiles, is binary in nature, making it difficult to achieve varying shades of gray. The development process, in which charged toner particles are attracted to the latent image exposed on a photoreceptor, operates as if it were digital in nature, (i.e., it is a very high contrast analog process). Therefore it is necessary to use higher resolution binary xerographic systems that resort to a method called half-toning to simulate gray scale. Smaller pixels are progressively clustered to form a larger pixel, or half-tone cell. This allows a varying of the number and arrangement of the elements that are to be white or black, resulting in a visually "gray" half-tone cell.

The precision and computational power to generate such a cell is much higher than for a binary desktop laser printer and represents a limiting factor in a laser printer's ability to achieve gray scale. In addition to higher perceived resolution, gray scale is rapidly becoming a necessary feature in a printer designed to reproduce scenic images from photographic sources, or computer displays, because of the inherent complexity of the half-toning process.

In the latter case, computer displays can take advantage of the integrating response of the human eye to vary the gray scale or intensity of an image over a wide dynamic range. Pixels can turn off for periods of time within a frame's display time that the eye integrates together to produce a perceived continuous tone intensity gradation. Since computer displays frequently provide the images for printing, an incompatibility between the image produced on a display and the ability of a digital, binary printer to print it exists. The same is true for digitally scanned continuous-tone photographic images.

In summary, printing with binary digital printers has limitations. There exist difficulties in reproducing characters without distortion, loss of detail, sampling artifacts, or positional errors at lower resolutions. Gray scale simulation using higher resolution printers, must result in acceptable combinations of gray and freedom from visual artifacts.

SUMMARY OF THE INVENTION

The present invention disclosed herein comprises a printing system capable of both resolution enhancement and multiple gray-scale levels by manipulating pixel size and placement within standard printing parameters. These capabilities result from the ability to implement sub-pixel modulation with spatial light modulators incorporating a range of user-selectable pixel element sizes.

It is an advantage of this system that it combines higher resolution with more gray shades than conventional binary printers using half-tone methods. It is a further advantage of this system to use less memory at the same resolution and gray scale than currently available, higher resolution, half-tone printers, and to reduce or eliminate the use of dithering algorithms to simulate gray scale. Both factors lead to system efficiencies, cost reductions, and improved quality printed images.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 1b–1d show various methods of resetting data on a digital micromirror.

DETAILED DESCRIPTION OF THE PREFERRED EMBODIMENTS

Figure 1A:
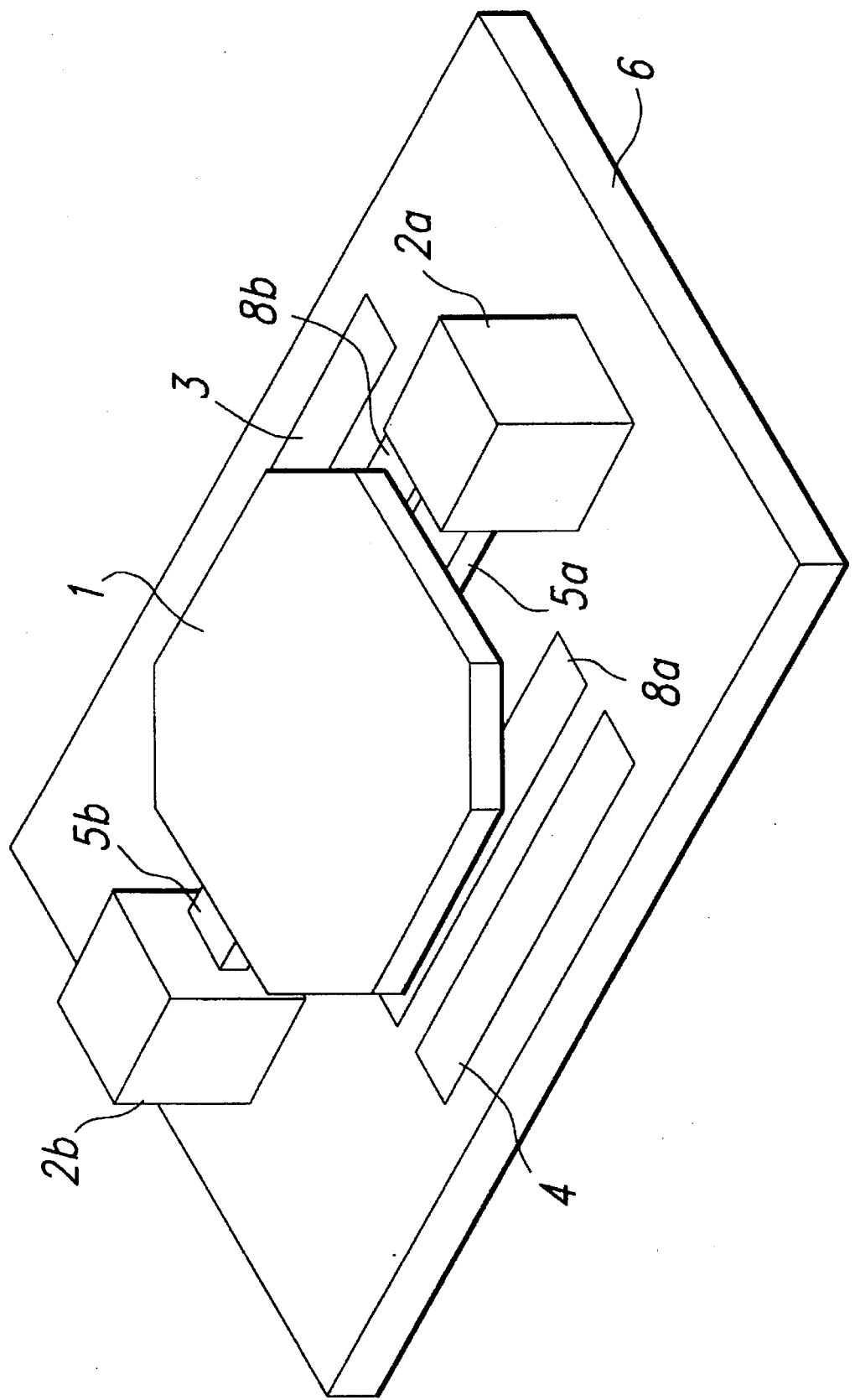
FIG. 1a shows a line drawing of a digital micromirror.

Digital copiers and printers, for all kinds of media, have inherent problems acceptably reproducing both high-resolution images and gray scale. The performance of laser printers has improved print quality by orders of magnitude over dot matrix printers, and replaced the office typewriter as the standard of print quality. Yet, typical desktop laser printers evidence limitations in both resolution and gray scale capability. Under inspection, the characters show ragged edges and graphics often appear coarse, because at nominal resolutions the individual pixels cannot replicate curves and diagonal lines that well.

Standard desktop laser printers, and many enhanced resolution systems, only have 300 dots-per-inch (dpi) addressability and slightly larger (overlapping) pixels that define the fundamental resolution of the printer. By analogy, display systems usually have dots that are larger than their addressing grid to assure overlap and help smooth out the resulting image. However, displays can modulate the intensity of individual pixels, while binary xerographic printers do not.

For both the printers and displays described, however, the ability of the human eye to resolve minimal size features, and light-to-dark transitions, exceeds the resolvability of the display system. A major difference between displays and digital printers is that the former can vary the gray level, or intensity, within a given pixel element over a wide dynamic range, while the digital printer produces only a black or a white (binary) spot. Since computer displays frequently provide the image for printing, an inherent incompatibility between the image produced on a display and the ability of a binary printer to reproduce it exists. The same is true for continuous tone (contone) images produced by photographic processes. The printer has to map the image to a much higher resolution system and then apply half-tone methods to simulate gray scale.

At the expense of complexity in controllers and printer engine subsystems, the laser printer can readily achieve higher resolutions than 300 dpi, and reduce the factors detracting from the appearance of hard-copy text and graphics to near invisibility. As a point of reference, a reasonable analog (light-lens) electro-photographic copier system can resolve and reproduce features corresponding to a 600 dot/inch addressability, which exceeds the ability of the eye to detect distortions. Printer page-description languages that are device independent can present a document, or image, to a digital printer at the limiting resolution of the printer, per se. For the 600 dot/inch example, however, the image contains four times as many pixels to manipulate, rasterize and image. The burdens on printer memory, microprocessors, and the capability of the printer equipment and optical scanner to support higher resolutions also typically climb as the square of the linear resolution. Equipment reliability and quality of consumables (e.g. toner and paper) become dominant limitations.

Systems used for typesetting, plate making, film processing, and applications demanding higher resolution run at resolutions from 1200 to 2500 dpi. Accordingly, they are usually bigger, slower, and much more expensive to buy and maintain than generic 300-dpi printers. With the added linear resolution comes the advantage that also allows a binary printer to simulate gray-scale, or photographic, images through a process called half-toning, where linear resolution is traded-off to produce gray-scale in images.

Gray-scale images, where areas of the image are not all black or all white, require the ability to render a variety of shadings to accurately simulate the desired image. This presents a fundamental difficulty for laser xerographic printers. Part of the problem lies in the nature of the process. In xerographic print engines, copiers, and plain-paper fax machines, etc., the latent image is created by optically exposing a photosensitive media (either from an original through a lens or by electronic means), toning or developing the image, and then transferring it to a piece of paper by electrostatic means. The charged toner moves to the exposed portions of the photoconductor where the latent image resides (or vice-versa, depending on whether the development is positive or reversal).

Attracting a variable portion of the toner to the photoconductor at each exposed pixel location creates various problems because the typical exposure-developer process is more digital than analog as operated and very high-contrast in nature as a result. Toner granularity also factors into the process of rendering low-noise, gray-scale images. This problem exists in a similar setting for all kinds of xerographic printing, copiers, and fax machines. Controlling the exposure process, the photoconductor sensitivity, and the developer process to allow reproduction of pixels with smooth, accurate gray levels is a very demanding task.

As a result, higher resolution binary xerographic systems resort to the method called half-toning to simulate gray scale for contone image reproduction. A macro-pixel, consisting of an array of the smallest printer pixels, is generated, with a varying number of the addressable elements being white or black to simulate a desired level of gray. The drawbacks become a trade-off between linear resolution, available levels of gray scale, and computational requirements to generate the half-tone cell during the print process. Because the cells can be filled many different ways, artifacts and pixel-to-pixel interactions also occur.

As an example, a macro-pixel with m–sub-pixel elements can generally give m+1 gradation levels. A 2×2 pixel, consisting of four elements, can, thus, provide white, black, and three intermediate levels of gray, totaling five levels. Depending on the filling sequence, neighboring cells can interact to produce unwanted artifacts such as contouring or coarseness. Other fill patterns can produce symmetrical screen patterns that are visible to the eye.

In addition, the direct result of forming such a half-tone cell is a corresponding loss of 2× in linear resolution, and, with only 5 levels, the 2×2 cell is totally inadequate for useful gray scale. General rules of thumb suggest a relationship between linear resolution, typically called screen size, and gray scale for good quality printing. As a minimum, 64 gray levels and a 100-line screen, and preferably 128 gray levels and a 200-line screen, are desired. In terms of a 1200 dot/inch laser printer, the trade-off gives about 100 gray levels at a 120-line screen, acceptable performance only for low-end applications, so commercial type-setting systems use at least 2500 pixel per inch resolution to achieve gray scale for photographic reproduction.

It is also useful to vary the size or intensity of individual pixels to improve text and line graphics, but the generic laser printer lacks the capability. An alternate approach that has recently emerged in the laser printer industry is the simulation process called resolution enhancement, RET. This process also does not produce gray-level pixels; it does vary the shape, size, and location of the digital pixel by controlling laser power and timing. By shortening the dot exposure time, and delaying it, a smaller, oval-shaped spot can be positioned within the full-size pixel boundaries. The spot can be moved across the width of the pixel in the direction of the laser scanning spot motion. Resolution is effectively increased along the scan direction by the process. Reducing laser power levels can flatten the spot, shortening its dimension in the print processing direction which is orthogonal to the scan axis. By moving around bits of pixels, character appearance can be enhanced, and jagged features smoothed out.

The general printing problem can be summarized as follows. Characters must be faithfully reproduced to the human eye without distortion, blurring or other loss of detail, sampling artifacts, or positional errors. Gray-scale implementations must produce acceptable combinations of gray levels and linear resolution, free of artifacts from the formation of half-tone cells. System approaches must be reliable and produce consistent results from day to day.

In addition to the widely-adopted laser polygon scanned printer systems described, xerographic printers and film exposure systems have been developed using various forms of spatial light modulators (SLMs), and emitting arrays, such as the light emitting diode (LED) array. The SLMs, while desirable for cost, size, and performance reasons, have generally resulted in digital systems with one or more limitations in terms of the requirements for the printing process as discussed above. Examples of such SLMs are liquid crystal devices (LCD), electro-optic crystals, magneto-optic cells and digital micromirror devices (DMDs), also known as deformable mirror devices.

Many of these modulators consist of arrays of cells that can be addressed to turn ON or OFF by changing transmission states. The LED is the only active emitter array. Reflective modulators such as the DMD are typically considered to be ON when the cell deflects light towards an imager lens and thence to an image-forming surface, whether a viewing screen or a photosensitive medium. Some of the other arrays absorb the incident light when OFF and transmit it when ON. Some have limitations in spectral bandwidth (LED and magneto-optic), and in some cases the architecture suffers from pixel-to-pixel cross talk. Any of the hybrid technologies, e.g. electro-optic, are typically difficult to manufacture. The DMD does not suffer from any of the aforementioned limitations.

DMD SLM DEVICES

The digital micromirror device (DMD) is fabricated using a monolithic silicon Metal-Oxide Semiconductor (MOS) process. The substrate contains the addressing circuits and logic to accept digital data inputs and route them to memory cell arrays fabricated in the shape of any desired SLM integrated circuit (IC). Above the addressing circuits, an array of microscopic (17 micron×17 micron) metal mirror elements are fabricated that can respond to the underlying address circuits by rotating about an axis in the plane of the array (FIG. 1a). Typical rotation angles are ±10 degrees and the response time is 10's of μsecs. The array can be essentially square, as in the case of displays, or long and narrow for printing applications. Examples of the former are 640×480 pixels and the latter 2500×16 pixels.

In operation, the DMD must be illuminated by an external light source, being a passive-reflective SLM. Arrangement of the optics to accomplish a practical SLM system for printing applications is described in U.S. Pat. No. 5,101,236 "Light Energy Control System and Method of Operation," Mar. 31, 1992. The same optical principles apply to display systems utilizing DMD's in the form of area arrays.

For displays, the modulator cells are usually turned ON and OFF repeatedly for a total ON time that is a fraction of the frame time, or left ON for a fraction of the frame time and then switched OFF. By either of these methods of reducing total light levels through pulse-width modulation (PWM), the display can simulate gray scale by taking advantage of the integrating characteristics of the human eye. Of course, gray scale is a generic term for intensity that is also applicable to color displays. PWM gray scale techniques allow for different shades of color, for example, by dividing each color field into 8 binary segments, ranging from a least-significant bit (LSB) to a most-significant bit (MSB) and typically factored on a binary scale (e.g. ½, ¼, etc.). The LSB has the shortest time ON and the MSB has the longest time ON. Appropriate combinations of the 8 binary segments give up to 256 distinct gray levels for each color, and a total of over 16 million colors.

Because an area array display reimages each DMD pixel to a fixed point in the display plane, and the time for a (60 Hz) display frame is 5.7 milliseconds for each field of color, color gray-scale can be achieved very readily using 8-bit PWM. The problem in printing applications lies in the relatively short raster line time available to accomplish PWM. In order for a 300 dpi printer to produce a reasonable output in pages-per-minute, it must print an entire line in under a millisecond. To achieve gray scale as described for displays, where the frame time is as long as 16 milliseconds, is impractical. The 25 μsec response time of the DMD limits the number of times it can cycle ON and OFF usefully within a raster-line at print speeds much greater than 15 pages-per-minute. Therefore, only a limited gray scale range can be accommodated.

FIG. 1a illustrates one example of a DMD spatial light modulator pixel element. Bistable DMDs typically consist of two address electrodes 8a, and 8b, on either side of the rotational axis of a highly reflective mirror, 1, supported on posts 2a and 2b, by torsion hinges 5a and 5b. Additionally, the DMD cells have landing electrodes 3 and 4, held at the same voltage as the mirror element, 1, to avoid any risk of contact welding. The address electrodes nominally alternate between 0 and 5 volts in response to inputs from underlying address logic, and the mirror rotates accordingly in response to electrostatic forces of attraction. U.S. Pat. No. 5,061,049, "Spatial Light Modulator and Method," describes these devices in more detail. In operation, the individual elements are rotated about hinges in response to either the 8a or 8b electrode, typically deflecting ±10 degrees until the landing electrode and mirror edge contact. Since the electrodes 8a and 8b cause the mirror to rotate through an angle, they are often referred to as the $\phi_A$ and $\phi_B$ electrodes. Mirror elements are nominally 17 microns on an edge (0.0003 ram square area), but size, shape and pitch can be varied by design, as can the landing angle, θ).

FIG. 1b details the timing and voltages necessary to operate the DMD elements. The figure shows the effects of the control function bias 10, address bias 14 and 16, reset pulse train ($t_R$) 12, on the rotational state of the mirror line 18, where cross hatched areas represent mirror ON-states (or OFF-states, after $t_3$).

In the sequence of FIG. 1b, an address voltage (+5 volts) is switched at $t_o$ on the address electrodes 14, and 16, (ON to OFF state) corresponding to 8a and 8b, through the respective memory cell in the silicon substrate 6 in FIG. 1a. The mirror remains latched in the previous state through the attractive action of the bias voltage, 10, (−10 volts) which is applied to all mirror elements in parallel. At $t_o$, the negative bias is present, but the reset sequence, 12, is not. After the addressing voltage becomes true, the reset sequence, 12, commences at $t_1$, and lasts several cycles until $t_2$. During this time $V_{bias}$, 10, is off. The reset pulse train is tuned to a plate resonance of the particular DMD mirror architecture, and electrically pumps mechanical energy into the mirror pixels between $t_1$ and $t_2$ (2 μsecs). It is typically a five-pulse train at −24 volts.

At $t_2$, both bias and reset voltages are 0, and the reset mirror is free to rotate from a deflected state 18, to a flat state (slightly before $t_3$) and then on to the opposite deflected state, 19, at $t_4$, under the combined attraction of the new address voltage, $\phi_B$, and the bias voltage, 10, which is reapplied at $t_3$ (−10 V). The absolute magnitude of the negative bias and positive address voltages combine to 15 volts, sufficient to rotate the mirror element fully to the opposite landed (−10 degrees) state. Bias must be precisely applied, after the mirror has physically achieved the angular offset incurred as a result of the new address voltage condition, e.g., at $t_3$. The mirror flight time, $t_2$–$t_3$, is about 8–10 μsecs. The reset sequence is described in more detail in U.S. Pat. No. 5,096,279.

One problem with the sequence lies in the time it takes to reset the cell. When the reset cycle completes, DMDs typically return to their undeflected states and then wait for the application of a bias voltage that allows them to move to their new states. In the example above, the data causes a change in state, but the same reset and return to a neutral state occurs then a state change is not required, resulting in a temporary but efficiency-decreasing OFF-state time.

FIG. 1c actually represents the aforementioned pulse-width modulation (PWM) method for achieving gray-scale with a DMD. Within a line time, or a frame time, in the case of displays, the DMD cycles ON and OFF 4 times in this example, corresponding to 4 bits of gray-scale, since each ON segment is half the duration of the prior segment. Thus, ON period 18a is the most significant bit, and ON period 18d is the least significant bit (LSB). By combining these binary pulse widths, $2^4$, or 16 different gray level can be simulated, corresponding to the respective portions of an entire line (or frame) time that the given pixel element is ON. Note on line 10, that each reset time period, $t_R$, detracts from the allowable ON time of the mirror, line 18. The reset cycle, $t_R$, is expanded to show detail but is actually on the order of the LSB.

In the case of displays, each pixel image is spatially fixed on the screen, and the binary PWM, FIG. 1c, effectively integrates the light intensity at a fixed spot as perceived by the viewer's eye. However, for a printing process, where the optically sensitive media, or organic photoreceptor (OPC), is moving with respect to the spatially fixed images of the exposing DMD pixels, unwanted artifacts can occur. This results due to the fact that the OPC motion spatially separates the components of the PWM signal, effectively mapping the pulses from the time domain to the spatial domain according to the relationship $X(position) = V(OPC\ velocity) * t(seconds)$, where t is the time difference between for example, the MSB and the LSB, the worst-case example, and X defines the resultant physical separation of the imaged spots.

The resulting binary PWM patterns form particularly objectional artifacts to the human eye at certain spatial frequencies on the order of 5 to 10 line pairs per millimeter. This spacing is very close to a 300 dpi printer process, so the spatial separation from PWM is readily apparent. Two nearly equivalent gray levels, for example the MSB and MSB-1, will be very spatially distinct due to the necessary combinations of all the lower order bits to produce a level MSB-1. The subtle change in gray level can be lost in the substantial spatial differences between the two pixel patterns. It is therefore desirable to render gray scale in printing by PWM using some set of patterns that are non-binary and not susceptible to this effect. A linear pattern, simple dividing the pixel into equally spaced ON and OFF bars would improve the smoothness of the gray levels, but would be prohibitively complicated to implement at more than a few levels of gray.

In particular, sub-dividing a relatively low speed dot line of 1 msec to yield 16 gray levels would require 16 pixel transitions, per line, versus only four for the 4-bit, 16-level binary example. Each line-pair corresponds to only 62 μsecs total allowable duration. Since the reset address time is 20 μsec, and two are required per line pair, almost all the time is spent addressing the DMD, and exposure efficiency drops to only 30%. In any event, a 1 millisecond line time, and only 16 gray levels are of only limited interest for printing applications. So improved techniques for producing upwards of 128 gray levels, at line time corresponding to a 50 page per minute print process, or 300 μsec, and without introducing artifacts at the pixel level are required. One possibility arises if a method for latching some DMD elements while selectively readdressing others can be implemented.

DMD OPERATION

DMD deflection arises due to electrostatic attraction between the mirror element and the underlying substrate, specifically the address electrodes. The attractive force is proportional to the square of the magnitude of the potential difference, and inversely proportional to the square of the air gap separating the mirror and the substrate. The restoring force due to the torsion hinge is linearly proportional to a spring constant, k, and the twist angle, θ. At some percentage of the maximum (landed) deflection angle, the quadratic force of attraction overwhelms the linear restoring torque and the mirror spontaneously falls into an electrostatic potential well until the tip touches the landing electrode which then provides an equilibrating reaction force. The pixel stops at a precise angle defined by the air gap and the size of the pixel from the tip to the axis of rotation.

The potential difference is comprised of two components. The first is the positive address voltage, nominally 0 or 5 volts, and the second is a negative bias voltage applied directly to the mirror structure. In the absence of addressing and for an ideal mirror structure, symmetry of attraction on each side of the torsion hinge would prevent a mirror from rotating just due to application of a bias voltage alone.

In practice, the application of a +5 volt address signal to either phase of the address electrodes, $\phi_a$ or $\phi_b$, tilts the mirror in that direction a small percentage of the maximum deflection permissible. Subsequent application of a negative bias voltage then acts to increase the deflection until the collapse to the full rotation angle occurs. For the device geometries described in the referenced patents, a 5 volt address combined with a −10 volt bias, to total 15 volts, provides sufficient attraction to achieve full angular displacement. The average voltage to cause full rotation, called the collapse voltage, is nominally 12 volts, so in principle, a +2 volt address and a −10 bias could achieve deflection. The added 3 volts of address margin is required to assure complete deflection of all pixels aver a range of operating conditions, and to accommodate device changes over time.

When the pixel state is to be updated, the first step is to turn OFF the bias voltage. Ideally, all pixels would release and return somewhere close to the flat state, since the address voltage is insufficient to hold the pixel at full rotation against the torsion spring. In practice, the controlled −24 volt reset pulse is used to electrically "pluck" the pixel and resonantly store mechanical energy in it to assist in the release and return to the flat state. When the mirror has equilibrated to whichever side of the flat (θ=0) condition that is dictated by the state of the address electrodes, bias is reapplied and the pixel rotates correspondingly to ±θ$_{max}$ again.

The ability to finely control the occurrences and the amplitude relationships of the bias, reset, address and holding voltages permits selective reset and rotation of mirrors on which data is to be changed. The mirrors on which the data does not change remain fixed throughout the reset process. A fully rotated DMD pixel can latch and hold data, even in the presence of a reset signal.

It is desirable to avoid the delays associated with the return to a flat state (θ=0), and subsequent rerotation to the initial state. One such approach modifies the current reset process, which returns V$_{bias}$ to 0 during and after reset. Since any residual reset or bias voltage subtracts directly from the address voltage margin, V$_{bias}$=0 is required for 5 volt addressing, and the associated need for 3 volts of address margin. Reliable operation can not be achieved with any residual bias voltage, during the period when the pixel returns to θ=0, since the pixel may fail to rotate through θ=0, and therefore cannot respond to the alternate address condition. It has been pointed out that leaving the 5 volt address on the address electrode alone is not sufficient to latch the pixel after reset.

It is possible with existing CMOS address structure designs to operate the addressing at voltages between 5 and 10 volts. If V$_{address}$ is increased to 6.5 volts for example, then for a constant value of address-plus-bias at 15 volts, V$_{bias}$ can be reduced to −8.5 volts. More importantly, V$_{bias}$ can now remain at −1.5 volts throughout the reset process, and still permit a true address voltage margin of +3 volts. This is the result of subtracting the residual bias voltage (−1.5 volts) and the minimum threshold address voltage (+2.0 volts) to arrive at the desired address voltage margin, 3 volts.

Figure 1D:
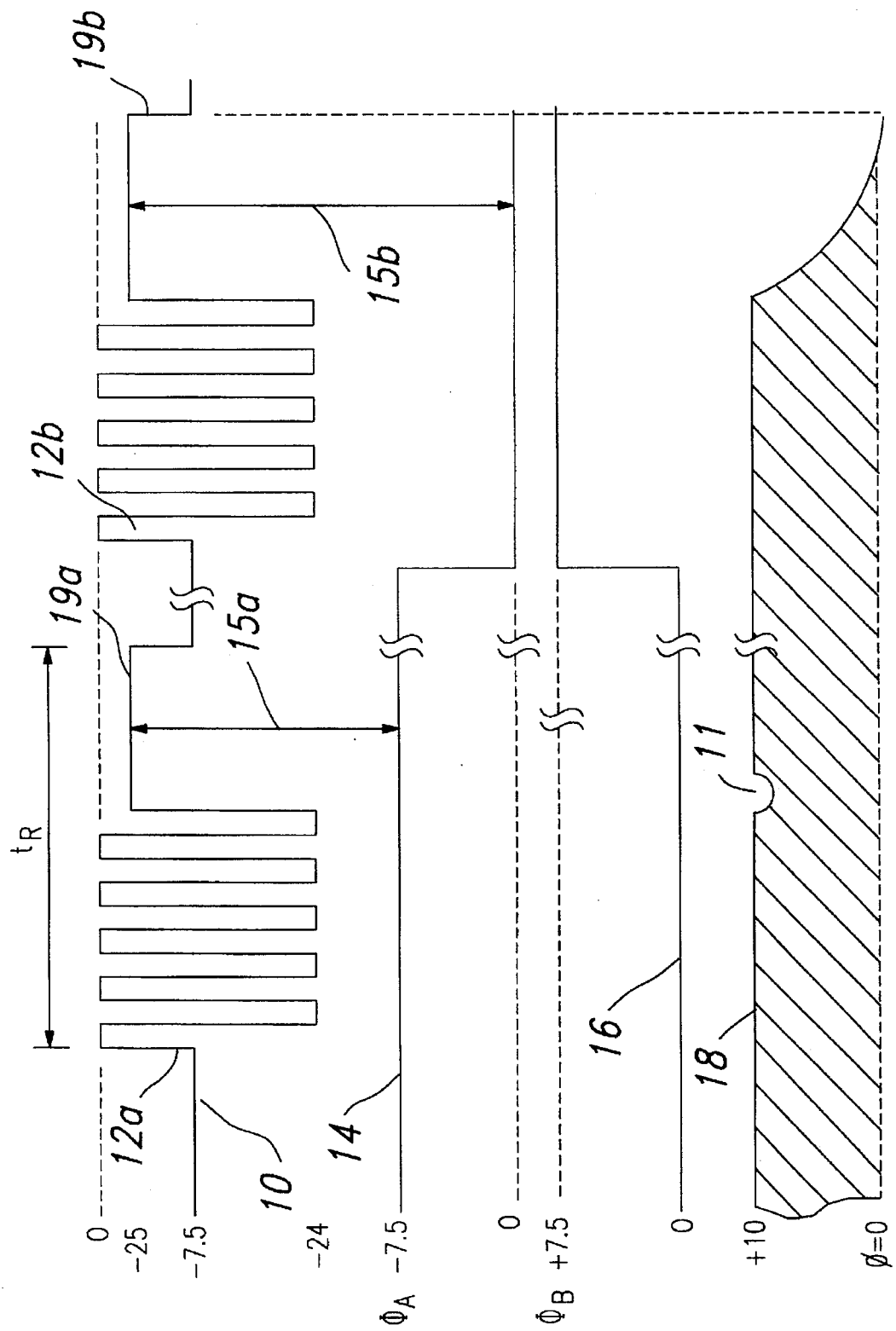

As a result of increasing the address voltage, and permitting each volt of increase in address to be balanced by a corresponding increase in residual V$_{bias}$ (that is, bias voltage existing immediately after the reset cycle during the flight time of the pixel from θ$_{max}$ to θ=0), the magnitude of the holding potential increases by 2 volts for every volt in address. When the combination reaches around 10 volts, the holding voltage, the pixel will latch down and not return to θ=0 after reset. FIG. 1d diagrams this situation, corresponding with FIG. 1b.

Even though the reset 12a may free the continuously addressed pixel instantaneously, it will only counter rotate by a degree or two out of the θ$_{max}$=10° before the impressed voltage (10 volts) 15a returns it to θ$_{max}$. There is no loss of optical efficiency or exposure time, as indicated by the small dip in optical output 11. For the switch to the other rotation state, V$_{address}$ is on the counter electrode 16, and the pixel can return through θ=0 and thence to the newly addressed state despite residual holding voltage 15b. The magnitude of the arrows 15a and 15b do not correspond to the attractive potentials which are 10 volts and 2.5 volts respectively. It should be noted that the reduced bias voltage setting, −2.5 V in FIG. 1d is only maintained for 10 or 15 µsecs after reset and before applying the full V$_{bias}$ (which fully rotates the reset pixels) to assure latching of the selected pixels. Likewise, the elevated address voltage need only be applied momentarily to avoid stressing the CMOS circuitry.

The pliancy of the DMD hinges offers another design variable to be considered in the implementation of a reliable operational mode of the type just described, since more pliant hinges require lower bias voltage and lower latching potentials.

This method requires the additional feature of a randomly addressable CMOS structure to select individual DMD cells for rewriting. Since the DMD CMOS addressing array is typically an SRAM or DRAM memory array, this is not difficult to implement. Word and bit decode and address features to accomplish this are well known in the art. Since hard copy DMD devices are typically configured as very long arrays with fairly shallow columns, (e.g. 16 to 128 bits) the x-y addressing is not complicated.

This implementation has the advantages of simplifying addressing bandwidth problems and reducing DMD operating cycles when only small portions of the data array are changing. For printing applications it has the further advantage of resolving the artifacts associated with binary PWM, or the practical addressability limitations of linear PWM.

As an example of the many methods that utilize these latching and reset characteristics of the DMD, consider a group of four pixels used to emulate gray scale. Consider four adjacent pixels with which four differing exposure sequences are represented, as shown on line 18 in FIG. 1e). At the starting point for the line, all four pixels would be on. The first could represent the most significant bit of the group 18a, meaning that it would stay on the longest. At the first pulse of the reset line 12, the electrode state for the three higher bits, 18a, 18b, and 18c has not changed, but the lower order pixel 18d, would be switched OFF. The next bit switches OFF at the second pulse, and the third at the third pulse. Finally, the last bit, the pixel under consideration, receives it new data corresponding to the next printing line along with an update of the other pixels, and the process begins over again.

In this manner, the time overhead taken to accomplish gray scale by pulse width modulation is considerably improved. This allows the line times of a competitive page per minute rate to be maintained, and adds additional control over the number of gray scale levels accomplished. The tuning of the voltages also allows for an easier manipulation of the data to accomplish the appropriate images.

Manipulating the data with respect to timing can also be applied in the resolution enhancement of an image. One of the largest problems in resolution enhancement with spatial light modulator printers results from the cells' images being transferred to paper. Even on high resolution page printers, the print images show a staircase effect on the curved edges. This occurs because the cells are approximately square, and are staircased to try to fill the curve.

Figure 2A:
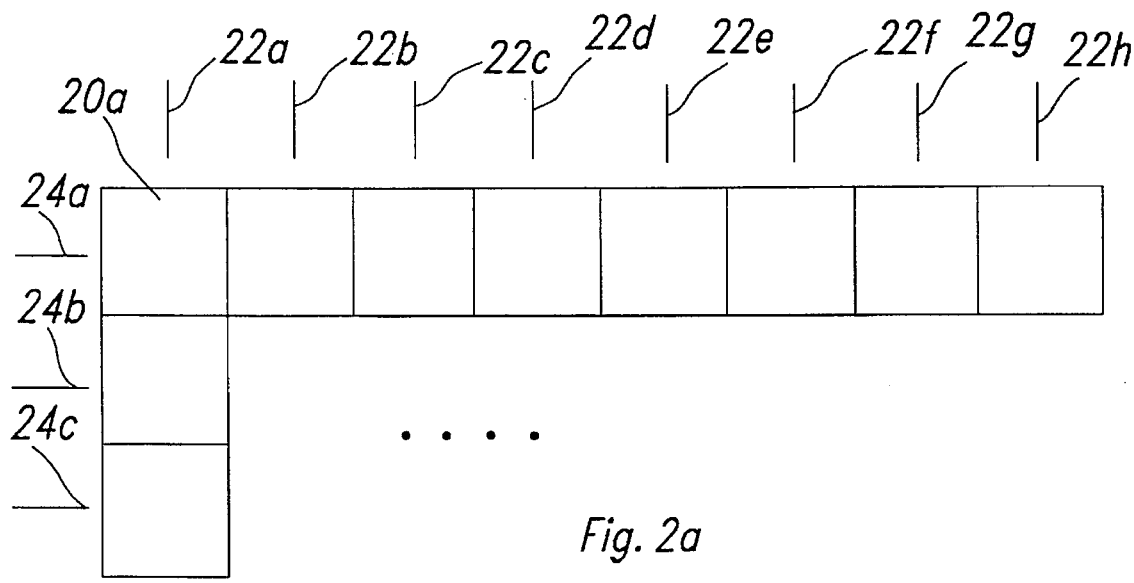
FIGS. 2a–d show a standard layout of an spatial light modulator and how the timing of the data can be used to better control aliasing effects.
Figures 2B, 2C:
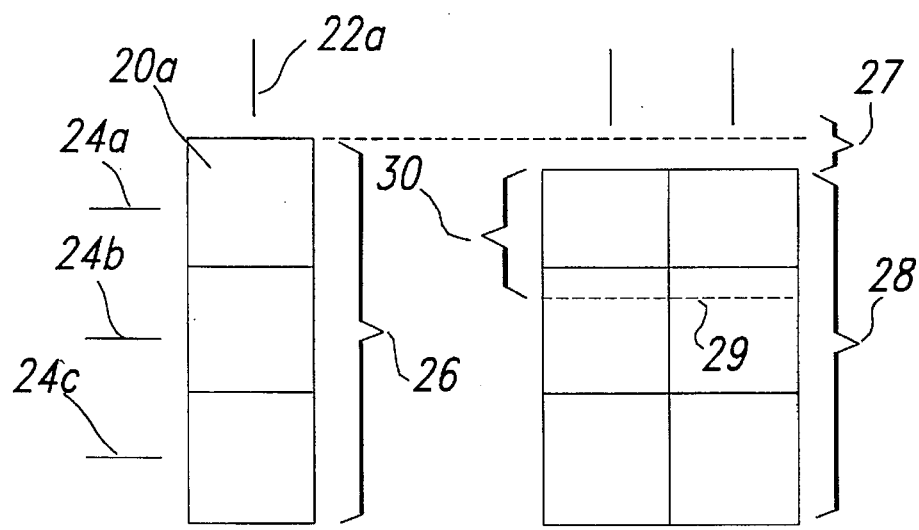

A typical layout of a spatial light modulator array is shown in FIG. 2a. Pixel 20a is centered about horizontal line 24 and vertical line 22a. Moving to the right, the pixels on line are successively centered lines 22a, 22b, etc. The print image resulting from column 22a with data loaded in standard ways is shown in FIG. 2b. The image of the first three pixels from the array of FIG. 2a is transferred to area 26 on FIG. 2b.

Figure 2D:
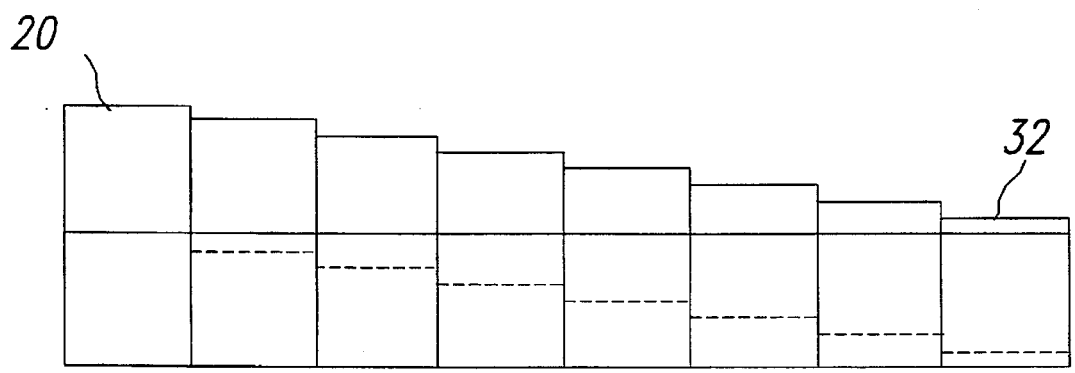

FIG. 2c shows one way to modify the staircasing effect at the edge of a print image 29. The top pixel 20 from the array receives its data at a later time. The drum continues to rotate and the pixel image occurs at an offset position 30. As the next pixel images are transferred, the bottom of the pixel becomes part of the image of the next standard timed pixels 29. This allows manipulation of the pixels' vertical extent to permit the detailed edges of print features to be represented on a much finer step. Taken, for example, to an eight step delay, the curve would appear as a series of pixels that have the size of the previous pixel, minus 1/8 of its height. This is shown in FIG. 2d. Selective readdressing of pixels is thus used to move edges of a printed object on an address grid that is finer than the resolution of the individual element in the process direction.

Figure 3:
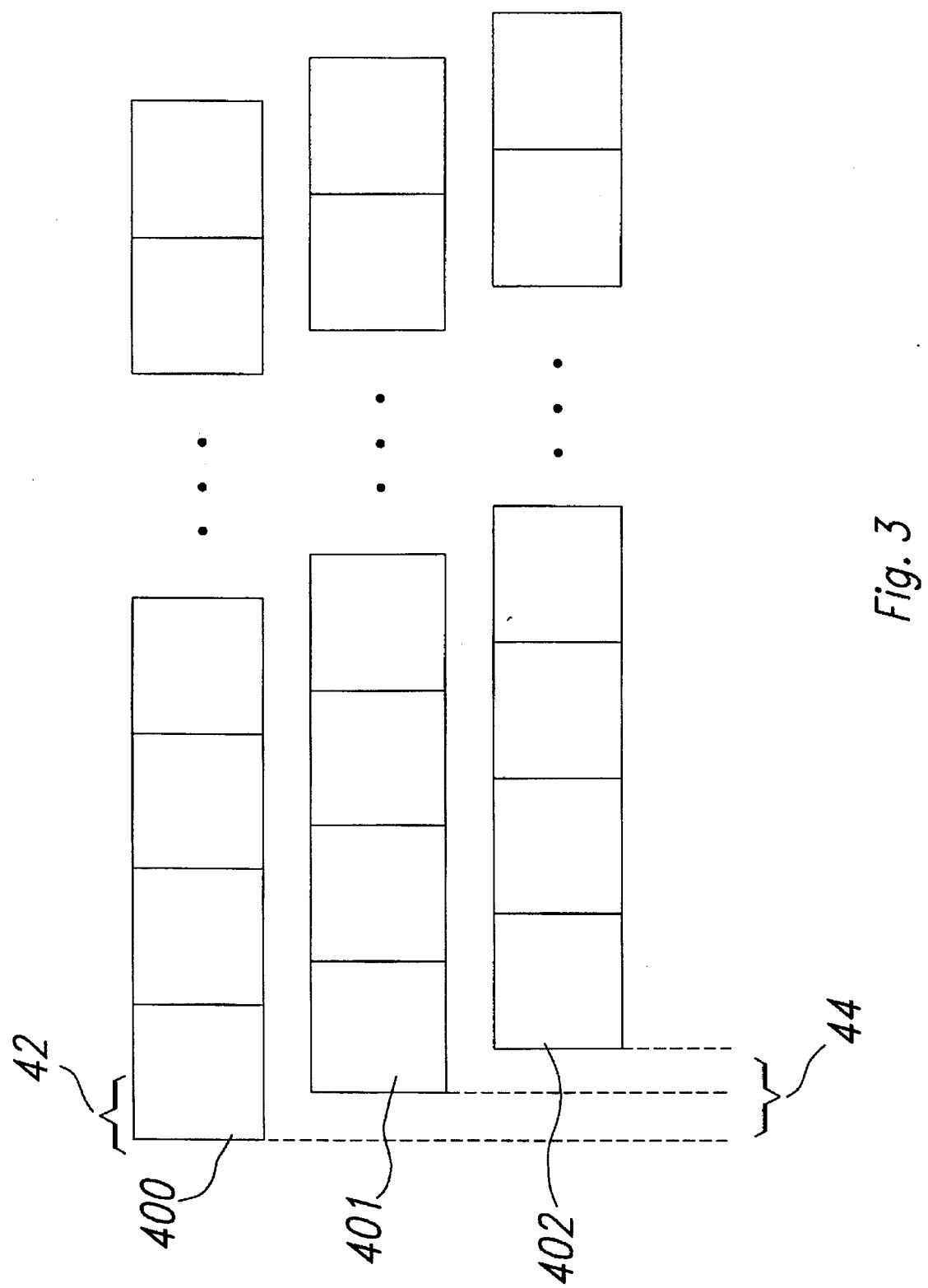
FIG. 3 shows horizontally offset pixels.

One limitation on FIG. 2 is the positioning of the centroid of the pixels. All of the differently sized pixels remain centered on the same x-y grid as the standard sized pixels. Many ways exist to achieve resolution enhancement along the direction of the SLM array, to complement the resolution enhancement just described in the process direction. One of these would be to maintain the current standard of 300 dots-per-inch (dpi), when printing easily resolved features, then switching to a higher dpi horizontal mode when printing curves or fine featured objects. An array of spatial light modulators that would accomplish this is shown in FIG. 3. By selecting the appropriate row, the edge of a feature may be incrementally offset in the horizontal direction, much the same as it was offset in the vertical or process direction by timing changes as described in FIG. 2.

The standard pixel 40 of FIG. 3 remains the same size. The row of pixels 401 starting after pixel 40 moves to the right an incremental distance. For example, if 900 dpi is the desire, then the next row of pixels needs to be at a 1/3 pixel offset from the first row, shown here as distance 42. Distance 44 then, equals 2/3 the width of the standard pixel, as the row starting with pixel 402 moves an additional 1/3 from the previous row. There is no limitation on how the rows can be offset from each other. The system may require the indented row to happen first, then the standard, then another indented row. Additionally, the designer may deem it necessary to have more than one row at any given offset.

The addressing circuitry for these pixels is the same as for the regular array (see FIG. 2a). The printer controller determines when a delayed edge is necessary to more exactly represent a feature, and delays the data for the line until line 401 or 402, etc., aligns with the latent image location on the OPC.

Figure 4:
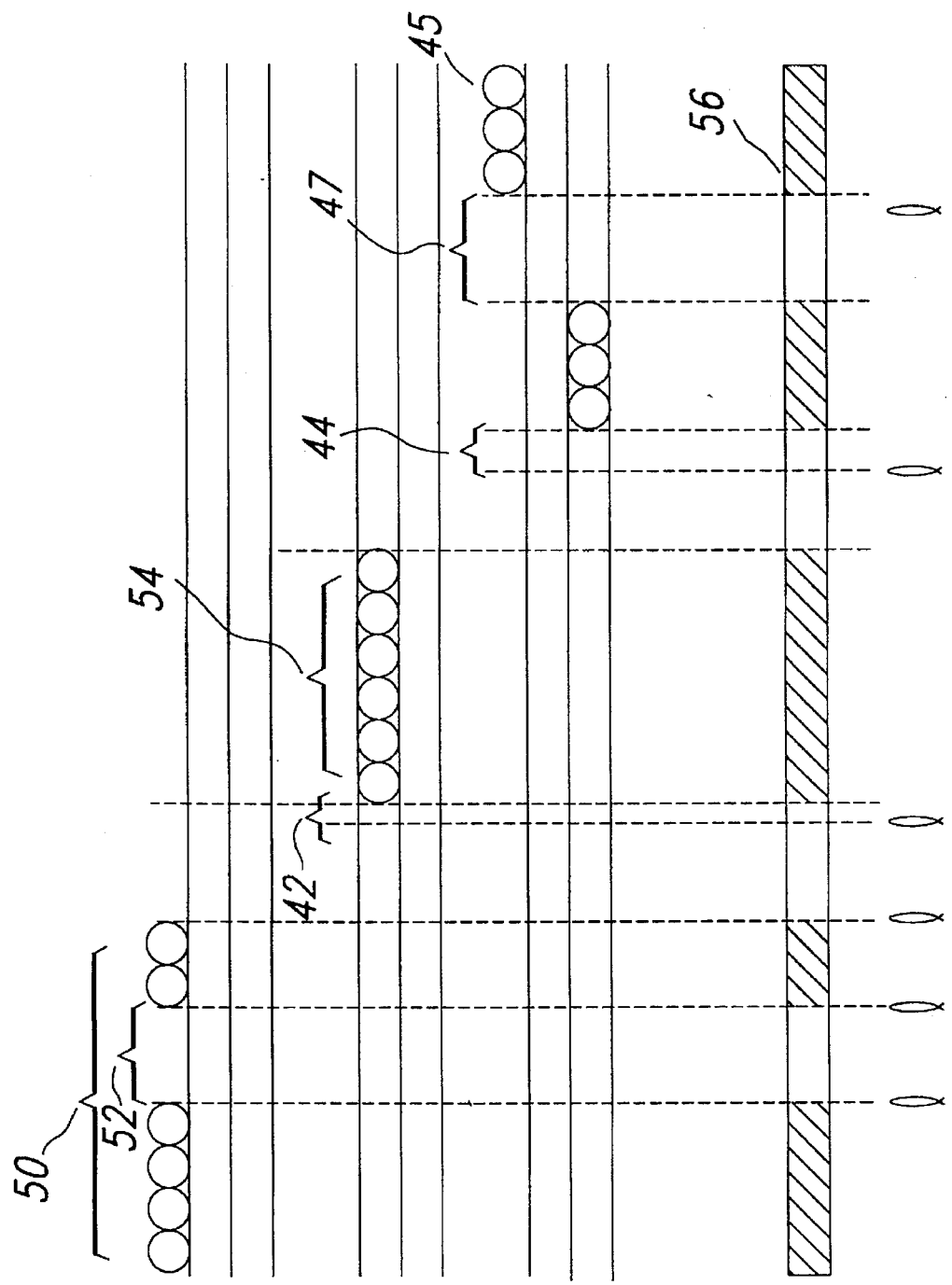
FIG. 4 shows a method of using horizontally offset pixels and the resultant print image.

A printed line resulting from this offset technique is shown in FIG. 4. The first two print features are illustrated by pixel line 50. The gap 52 between the features results from a nominal 2 pixels' width gap in the print exposure. However, the third aspect of the feature 54 is printed by the pixels of row 401 (from FIG. 3) which is offset by distance 42, equalling 1/3 the width of the standard pixel. Another gap in the line then occurs, followed by the 2/3 offset gap 44, exposed with DMD row 402 (from FIG. 3). At pixel row 45 the processor determined it needed to go back to the pixels that were not offset, row 400, resulting in the non-integer gap 47. Line 56 shows the resultant image transferred to the paper. Lines designated L represent the unadjusted pixel addressability grid corresponding to row 400 (FIG. 3).

Figure 5:
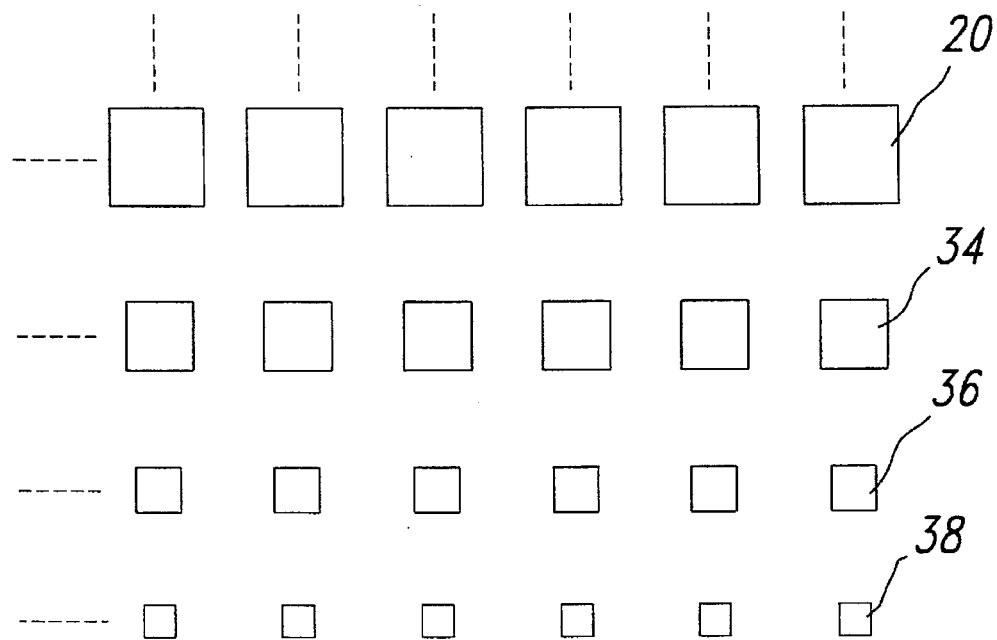
FIG. 5 shows a layout of fractionally sized pixels centered about an x-y grid.

An even more desirable method of manipulating the printed feature size is to physically change the pixels in the DMD array to be shorter, narrower or uniformly smaller than the resolution grid defined for the printer. This is shown in FIG. 5. The standard pixel 20 will be referred to as being of size 1. In this example, the reduction occurs in quarter size decrements, but this method is not limited to this particular setting. Pixel 34 has 0.75 the linear dimension and 0.5 the area of pixel 20. Similarly, pixel 36 has 0.25 the size, and pixel 38 has 0.0625 (1/16 th) the area. These smaller sized pixels are conceivable for just about any modulator, with the number of rows and columns of each size limited only by the application for which they will be used. For example, the designer may decide to have three rows of each sized pixel.

Figure 6:
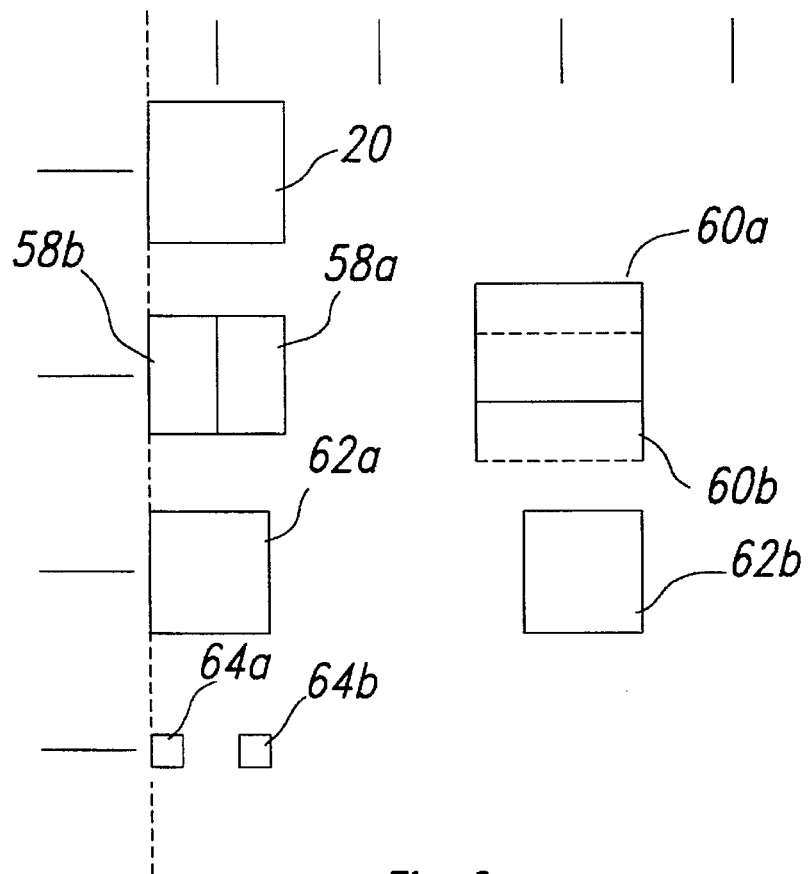
FIG. 6 shows examples of various combinations of pixels to achieve resolution enhancement.

Obviously, the advantages of the above methods could be combined to accomplish the even more powerful feature set of both horizontal and vertical resolution enhancement with gray scale imaging. An array that can accomplish timing delay (vertical offset), variable pixel sizes, shapes and grid locations and horizontal offset, is shown in FIG. 6.

The standard size pixel 20 centered about the regular x-y grid (lines 22 and 24 of FIG. 2a) is shown as reference. Pixels 58a and 58b illustrate half-sized pixels offset to align with the edges of pixel 20. Pixels 58a and 58b can be operated independently or in concert to simulate a rectangular pixel element at the expense of increased complexity and addressing circuitry. Because the electro-photographic process motion blurs a pixel image in the process directions, a purely rectangular pixel would have optical advantages. Pixels 60a and 60b demonstrate the rectangular-sized pixels and timing delay, with pixel 60b as the image of the pixel if it were delayed half a dot line. Pixels pairs 62a–b and 64a–b shown that the smaller pixels could be shifted left or right to match the left or right edges of the standard pixel. The pairs show 3/4 and 1/4 pixels, but could be any size of pixel that fits into the width of the standard pixel 20. Typically, the designer would not place these pixels in such a random manner, but this figure shown the various combinations of the above methods.

The question now arises as to the manufacture of such devices. Obviously, the manufacture of such an array would be difficult for most modulators. While this is true, it is conceivable that any of the above-mentioned modulators could be adapted to result in such an array. One modulator that is especially adaptable to this type of array is the digital micromirror device (DMD), particularly in its hidden hinge architecture.

The manufacture of DMDs is set forth in U.S. Pat. No. 5,061,049, issued on Oct. 29, 1991, manufacture of the double-level DMD is set forth in U.S. Pat. No. 5,083,857, issued Jan. 28, 1992, both of which are incorporated by reference herein. A silicon substrate has digital addressing circuitry manufactured by conventional CMOS methods, and subsequently electrodes are deposited on it that connect to the CMOS. These electrodes are then covered with an organic material that is removable via a plasma etch. Vias are cut into the organic material and a first layer of metal is deposited over it, filling the vias, after which it is patterned to form support posts. A second layer of metal is then deposited and patterned to form the mirror elements. Then the entire structure is etched to remove the organic material, leaving mirrors suspended over the electrodes, supported by the posts. Many variations on this process occur, including one where the mirror are supported by remnants of the organic material, not by posts.

Figure 7A:
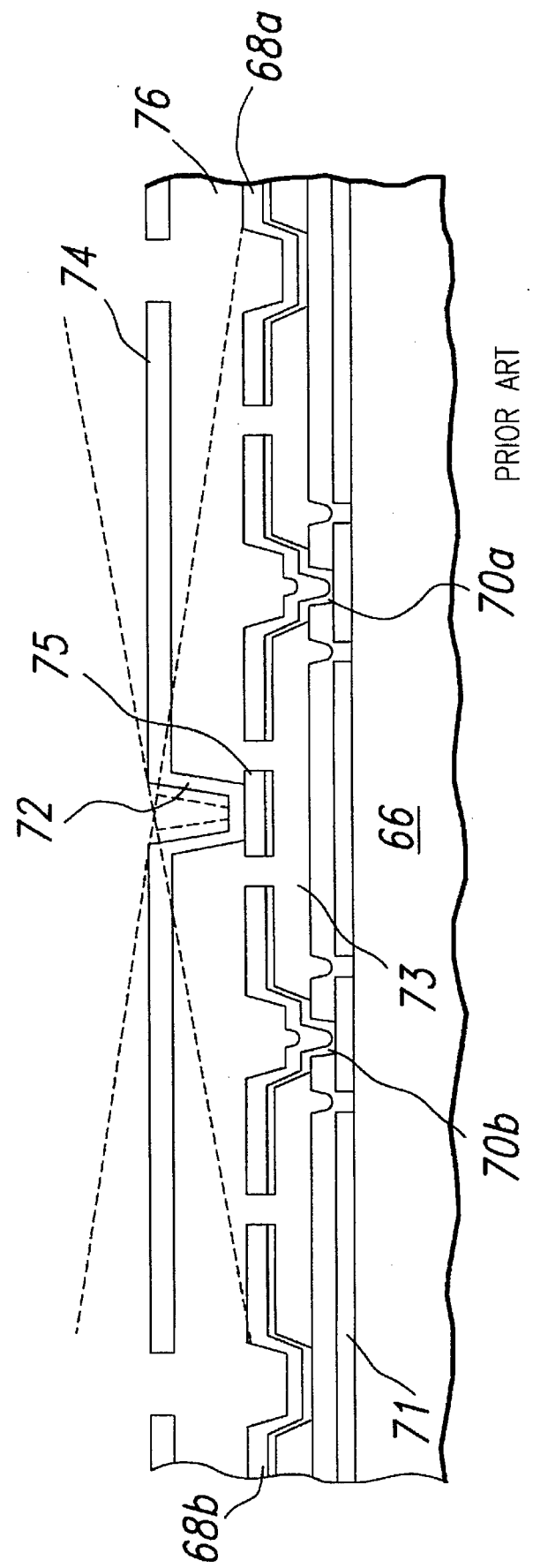
FIGS. 7a–c show diagrams of a double-level digital micromirror.

The hidden hinge architecture is another adaptation of this basic process. A prior art picture of a hidden hinge DMD is shown in FIG. 7a. The substrate 66 has the original layer of electrodes such as 71 upon or in it. The organic material originally resides in the layer shown by gap 73. The metal layers, shown by 68a and 68b then remain separated from the electrodes by the spacer layer. At this point, the original DMD would be complete. The hidden hinge is an adaptation of that process with an added layer. In the hidden hinge embodiment the electrodes 70a and 70b are raised above the substrate by gap 73, and now have what would have been mirror 75 in the original single level structure connected to them. A second layer of organic material is applied over this raised electrode layer, a via is formed to metal layer 68b and another layer of metal is deposited to form a post 72 and the second-level mirror 74. The second-level mirror is typically formed on the central area of the original mirror 75. The resultant structure is a mirror element 74, suspended over an air gap 76, after removal of the first and second layers of organic material, from above and below the electrode/mirrors 68a–b, which in turn are separated from the address circuitry by an air gap 73.

Figure 7B:
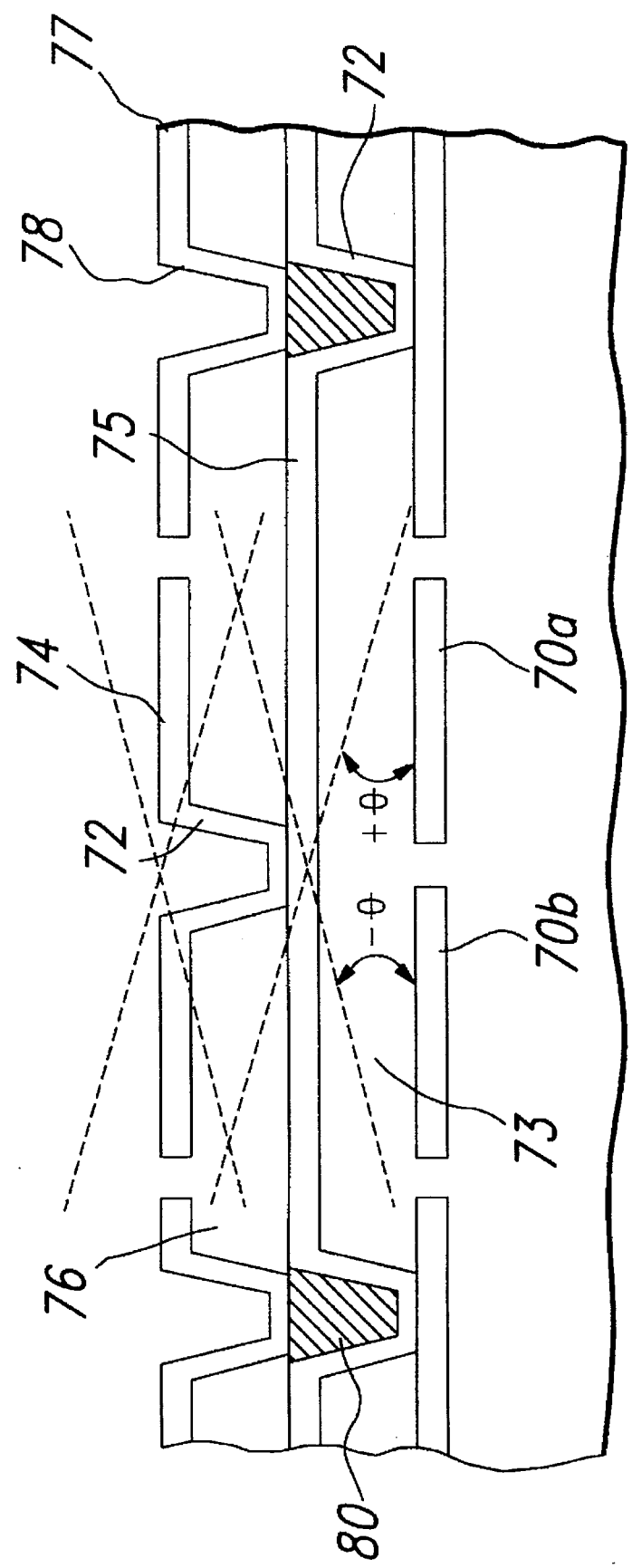

An additional adaptation that offers further advantages separates the first layer of metal 68 from the electrodes 71 without using layer 68 as electrodes as in the above example. A conventional DMD structure is fabricated in metal layers 68, complete with hinges, support posts and electrodes which remain at level 71. In this method, the address pulses actuate the first-level mirrors for addressing and air gap 73 uniquely determines the deflection angle. This separates the electronically active layer from the optically active layer, which is the second-level mirror 74. An additional advantage of this arrangement is that it is manufacturable with a uniform air gap 73 and a second uniform spacer thickness resulting in air gap 76, while permitting variable mirror dimensions to operate at the same rotation angle. This is shown in FIG. 7b.

The main advantage of this embodiment of the digital micromirror lies in the placement of the second level mirrors. The second level mirrors, since they are not constrained to be addressable, can move relative to the central post placement, and can be different sizes as suggested in FIGS. 5 and 6. A side view of this embodiment is shown schematically in FIG. 7b. Addressing electrodes 70a–b address the conventional first-level mirror 75, which has post 72 on it, corresponding to the spacer layer and ensuing air gap between electrical layer element 75 and optical layer elements 74 and 77. The entire DMD array consists of uniformly sized electrical elements 75 that operate identically to angles ±θ in response to control signals on electrodes 70a–b, and mirror 75. The optical elements 74 and the surrounding flat, specular metal surface 77 are supported on posts 72 and 78 respectively. The optical elements 74, regardless of size, location or geometry, ride along with the control element 75 to a precise ±θ deflection angle. The inactive, fill-in metal structure 77 prevent light from impinging on the lower mirror elements 75 and entering the optical system.

Figure 7C:
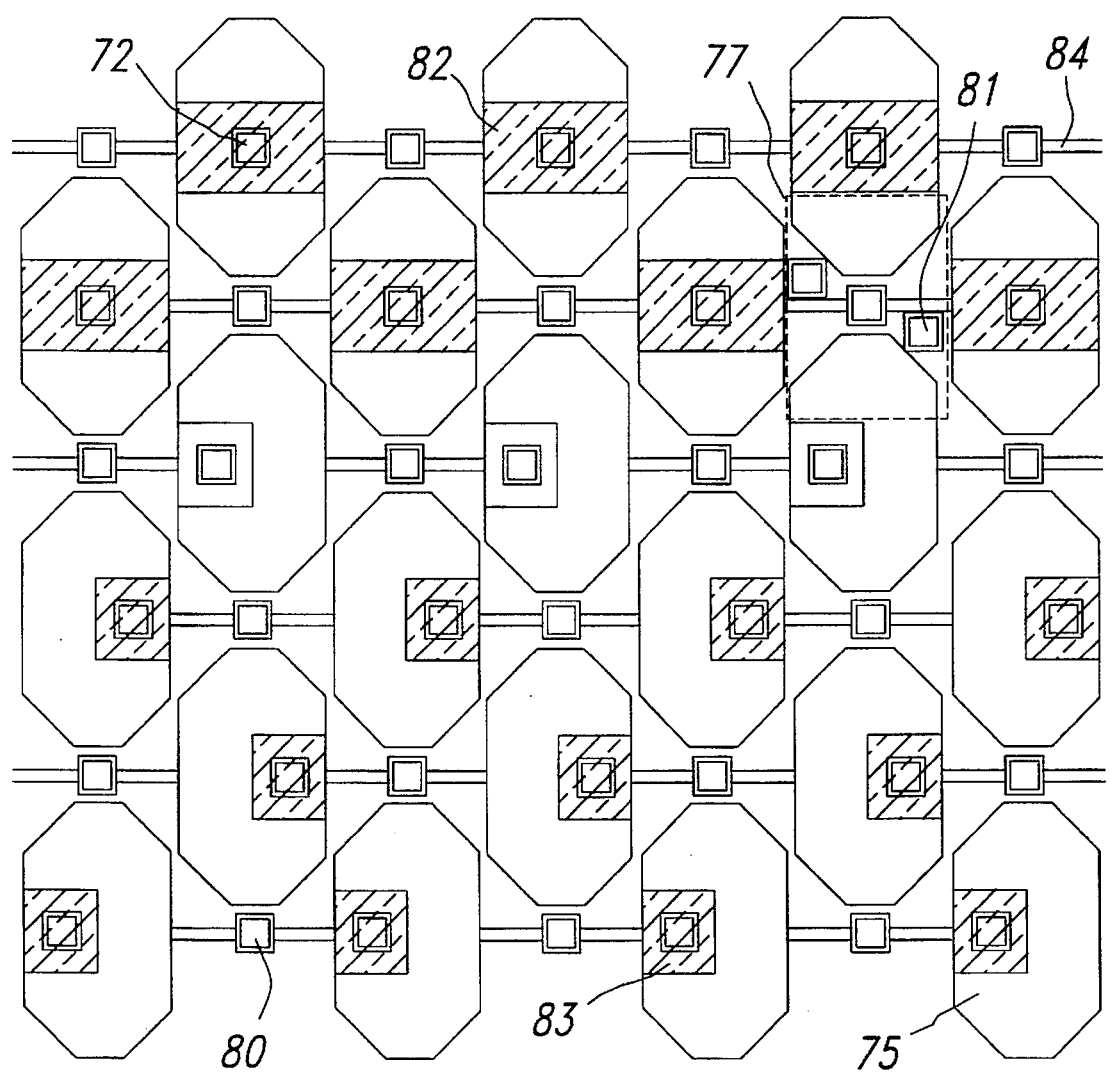

It is possible to fill the first level vias with a planarizing material 80 and permit the fabrication of second level via 78 directly above the first level via. In another configuration, shown in FIG. 7c, the posts supporting the non-modulating metal light shield 77, can be located as shown by 81, away from the active control element 75, and not directly over via 72. FIG. 7c shows a top view of the structure and two samples of alternative optical pixel element sizes and locations 82, 83. The hinges 84 are shown attached to vias 72, possibly with planarizing filler 80, that suspend the octagon shaped control elements 75 above control electrodes (not shown).

The cross-hatched sample of non-operating optical level metal 77 is necessary to shield the control level pixel structure from the optics. It is supported on vias 81 or 78 (FIG. 7b) depending on design considerations.

Pixel elements 82, in the first two rows, are rectangular (diagonally shaded) optically active portions of the array, attached to lower elements 75 by vias 72. As a second example, in keeping with FIG. 5 and 6, half-sized pixels (diagonally shaded) 83 are arrayed along four rows of operating elements 75 and staggered off-center to align with cell boundary edges. The combination of the four elements 83, when electronically re-interlaced, can be aligned to form a line image at twice the resolution of the basic control elements. This is constrained to meet electrical operating requirements. Elements 83 also correspond to the concept shown in FIG. 6, 64a and 64b.

FIG. 7c shows a horizontal hinge array for simplicity, but the approach is compatible with 45 degree hinges or any other angle of orientation.

Many other combinations, as discussed earlier, could be implemented on this structure. Since the electrostatic force constraints in achieving deflection are handled by the first-level mirror, the second-level mirrors have many more optical imaging possibilities with fewer, if any, constraints. The separation of optical requirements from addressing and electrical operation requirements is a major advantage.

Figure 8A:
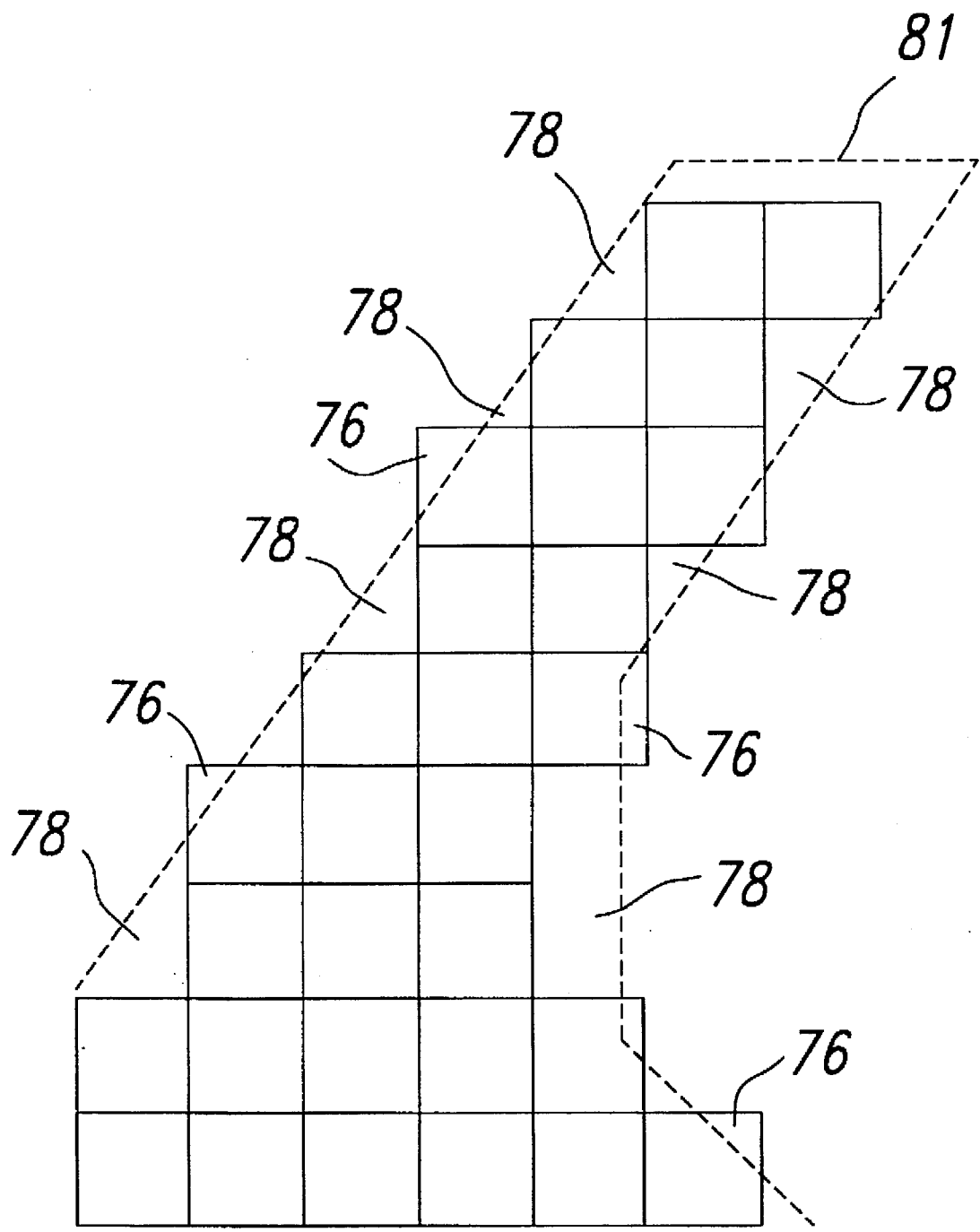
FIGS. 8a–b show a print feature using standard spatial light modulator arrays, and the same feature using an adapted array.

Once an array is manufactured that allows all of these possibilities, higher resolution printing with gray scale is possible. FIG. 8a shows the result of a standard 300 dpi printer implementation of a print feature. The desired print feature is shown in dotted lines. As can be seen by this drawing, there are numerous resolution related defects that reduce the resolution of the image. Artifacts labeled with the number 78 constitute indentations that cannot currently be resolved. Protrusions 76 represent the artifacts that have the opposite problem, where the pixels were too big to fill a gap in the image without extending beyond its limits.

Figure 8B:
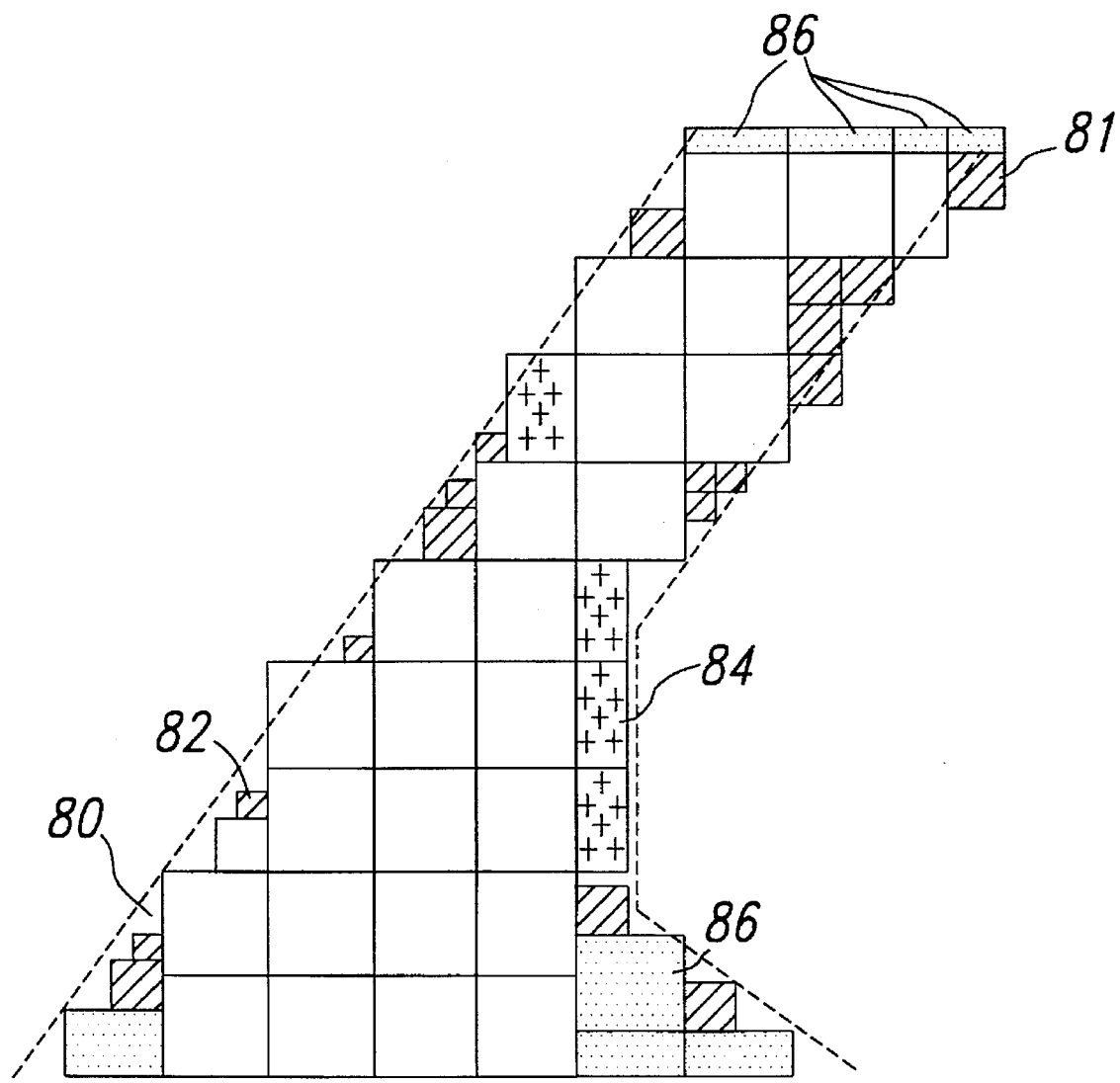

These artifacts are resolved in FIG. 8b. The pixels that are cross-hatched, 80 and 82, are those that are differently sized pixels, either 0.75, 0.5 or 0.25 times the standard pixel size. The dotted pixels 86 are those that were timing delayed and therefore appear to be shifted vertically. The pixels 84 filled with a cross pattern are those that were horizontally offset. Additionally, as discussed previously, any combination of the above could occur. For example, pixel 80 is not only a 0.5 size pixel, it is also horizontally offset to meet that corner. Pixel 82 is a 0.25 size pixel that could additionally be offset vertically by timing delay. Not shown is gray scale, which can also be implemented with this array as discussed previously. In this example, gray scale could be used to further enhance the appearance and outline of the printed feature. It has the further advantage of simulating true gray scale images by use of density modulation by pulse width control, or area modulation, at no reduction in linear resolution, achieved by using the smaller 'sub-pixels' shown in FIG. 5.

An ASIC reformatter chip, possibly incorporated on board the DMD, would provide the necessary data path control switching and the appropriate delays to operate this array. The processor would also have to decide which type of row, whether one of differently sized pixels, or horizontally offset, or standard, would receive that particular part of the data stream. Further, the processor would need to deride if the feature requires 300 dpi or 900 dpi, or whatever effective offset dpi is accomplished by the final selection of arrays. The appropriately encoded data would be decoded at the DMD in terms of timing, position or pixel size to achieve the desired printed feature. The processor would also be necessary to monitor the reset process to achieve the appropriate levels of gray. This allows the system to take advantage of all possibilities for higher quality printing: gray scale, timing delayed data, horizontally offset pixels, and differently sized pixels.

Thus, although there has been described to this point particular embodiments of methods for higher quality printing, it is not intended that such specific references be considered as limitations upon the scope of this invention except in-so-far as set forth in the following claims.

What is claimed is:

1. A method of high resolution printing, comprising:
   a. processing and analyzing data to alter the final image by at least one of three methods, said methods comprising:
      i. time-delaying the image data to achieve finer vertical control over print images;
      ii. horizontally offsetting pixel images to achieve finer horizontal control over print images; and
      iii. using pixels of fractional sized to achieve finer control over filling in print image.

2. The method of claim 1 wherein said spatial light modulator is a digital micromirror device.

3. The method of claim 1 wherein said spatial light modulator is a double-level digital micromirror device.

4. The method as claimed in claim 2 wherein said method also includes horizontally offsetting the pixels of an array to achieve a multiple of the original dots-per-inch resolution, by offsetting said pixels in fractional increments of the horizontal direction, and a method for achieving gray scale.

* * * * *